United States Patent
Mohamed et al.

(10) Patent No.: US 6,415,376 B1
(45) Date of Patent: Jul. 2, 2002

(54) APPARATUS AND METHOD FOR ISSUE GROUPING OF INSTRUCTIONS IN A VLIW PROCESSOR

(75) Inventors: Moataz A Mohamed, Irvine; Chien-Wei Li, Mission Viejo; John R. Spence, Villa Park, all of CA (US)

(73) Assignee: Conexant Sytems, Inc., Newport Beach, CA (US)

(*) Notice: Subject to any disclaimer, the term of this patent is extended or adjusted under 35 U.S.C. 154(b) by 104 days.

(21) Appl. No.: 09/595,791

(22) Filed: Jun. 16, 2000

(51) Int. Cl.$^7$ .................................. G06F 9/38
(52) U.S. Cl. .................. 712/24; 712/204; 712/206; 712/210; 712/213; 712/215
(58) Field of Search .................. 712/24, 204, 206, 712/210, 213, 215

(56) References Cited

U.S. PATENT DOCUMENTS

| | | |
|---|---|---|
| 5,581,718 A | 12/1996 | Grochowski |
| 5,649,135 A | 7/1997 | Pechanek et al. |
| 5,761,470 A | 6/1998 | Yoshida |
| 5,852,727 A | 12/1998 | Narayan et al. |
| 5,922,065 A | 7/1999 | Hull et al. |

FOREIGN PATENT DOCUMENTS

WO   WO 00/22515   4/2000

*Primary Examiner*—William M. Treat
(74) *Attorney, Agent, or Firm*—Farjami & Farjami LLP (57) ABSTRACT

An apparatus and method for issue grouping of instructions in a VLIW processor is disclosed. There can be one, two, or three issue groups (but no greater than three issue groups) in each VLIW packet. In one embodiment, a template in the VLIW packet comprises two issue group end markers where each issue group end marker comprises three bits. The three bits in the first issue group end marker identifies the instruction which is the last instruction in the first issue group. Likewise, the three bits in the second issue group end marker identifies the instruction which is the last instruction in the second issue group. Any instructions in the VLIW packet falling outside the two expressly defined first and second issue groups are placed in a third issue group. As such, three issue groups can be identified by use of the two issue group end markers. In one embodiment, the template of the VLIW packet includes a chaining bit. The chaining bit is used to "chain" instructions appearing after the last instruction of the last issue group of a first VLIW packet to the instructions in the first issue group of a second VLIW packet. In one embodiment, a mask generation logic along with other logic blocks are utilized to generate an appropriate mask. The generated mask is used to pass through instructions in a VLIW packet which belong to a same issue group for execution in a same clock cycle.

31 Claims, 6 Drawing Sheets

APPARATUS AND METHOD FOR ISSUE GROUPING OF INSTRUCTIONS IN A VLIW PROCESSOR

BACKGROUND OF THE INVENTION

1. Field of the Invention

The present invention is generally in the field of processors. In particular, the invention is in the field of VLIW (Very Long Instruction Word) processors.

2. Background Art

VLIW (Very Long Instruction Word) processors use an approach to parallelism according to which several instructions are included in a long instruction word which is fetched from memory every clock cycle. The long instruction word fetched from the memory is part of a packet referred to in this application as a VLIW packet or a "packet of instructions."

Instructions in a VLIW packet can be of different "instruction types." For example, a certain VLIW packet can have integer ALU type instructions such as "Shift and Add" and "Compare" instructions; non-integer ALU type instructions such as "Shift L Variable," "Shift R Variable," "Move to BR," and "Move from BR" instructions. Other exemplary instruction types in a typical VLIW packet are memory type instructions such as "Integer Load," "Integer Store," and "Line Prefetch" instructions; floating point type instructions such as "Floating Point Compare" and "Floating Point Clear Flags" instructions; and branch type instructions such as "Indirect Branch" and "Indirect Call" instructions.

Each of the several instructions in a VLIW packet is placed in a particular "instruction slot." Each instruction type is usually assigned to one or two specific logic units in a VLIW data path for execution Each such logic unit is referred to as an "execution unit" in the present application.

The individual instructions in a VLIW packet are arranged in different "issue groups" and there can be a number of issue groups in the VLIW packet. By way of background, a VLIW packet typically contains a number of instructions which can be executed in the same clock cycle. Instructions in a VLIW packet which can be executed in the same clock cycle form a single "issue group." By definition, instructions belonging to a same issue group do not depend on the result of execution of other instructions in that same issue group. However, instructions in one issue group may depend on the result of execution of instructions in another issue group. The "length" of an issue group specifies how many instructions are in that issue group. For example, a particular issue group may have a length of two instructions.

Figure 1:
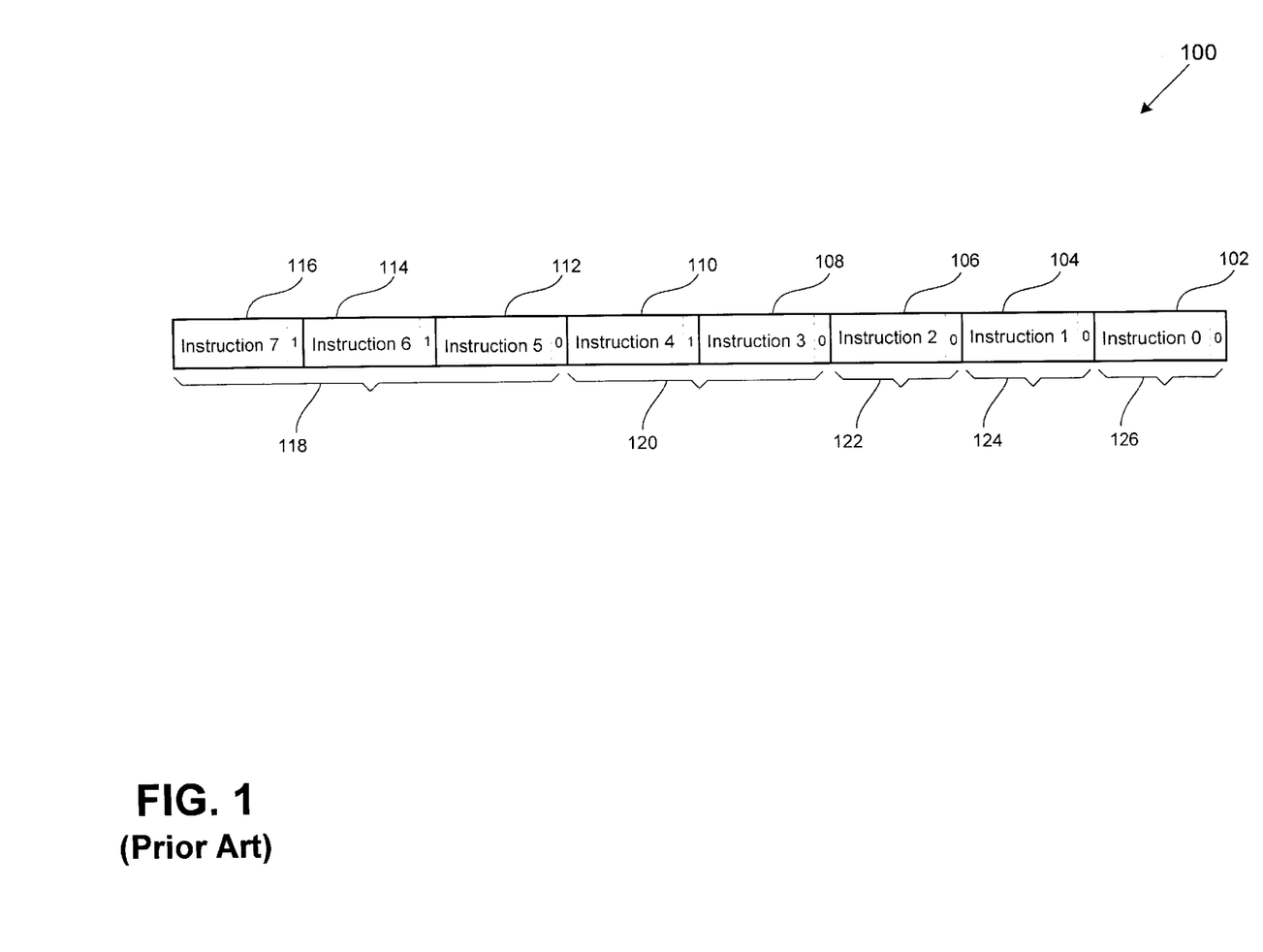
FIG. 1 shows a known prior art technique for identifying issue groups in a VLIW packet.

Thus, instructions which are in a same issue group are concurrently forwarded (i.e. "issued") to their respective execution units for execution in a same clock cycle. Accordingly, execution of all instructions in a VLIW packet may take as many clock cycles as there are issue groups in that VLIW packet. Referring to FIG. 1, one known technique for identifying the issue groups in a VLIW packet, such as VLIW packet 100, is now discussed. As shown in FIG. 1, eight individual instructions in VLIW packet 100 are placed in instruction slots 102 through 116. More specifically, instruction 0 is placed in instruction slot 102, instruction 1 is placed in instruction slot 104, instruction 2 is placed in instruction slot 106, instruction 3 is placed in instruction slot 108, instruction 4 is placed in instruction slot 110, instruction 5 is placed in instruction slot 112, instruction 6 is placed in instruction slot 114, and instruction 7 is placed in instruction slot 116.

In this known technique for identifying the issue groups in VLIW packet 100, a designated bit in each instruction slot 102 through 116 is used to identify the different issue groups in the VLIW packet. In the example shown in FIG. 1, the designated bit used for this purpose is isolated by a dashed line. For example, instruction slot 102 shows that the designated bit used for the purpose of identifying the issue group to which instruction 0 belongs is a "0". Likewise, instruction slots 104, 106, and 108 show that the respective designated bits used for the purpose of identifying the issue groups to which instructions 1, 2, and 3 respectively belong are all "0". Instruction slot 110 shows that the designated bit used for the purpose of identifying the issue group to which instruction 4 belongs is a "1" while instruction slot 112 shows that the designated bit used for the purpose of identifying the issue group to which instruction 5 belongs is a "0". Finally, instruction slots 114 and 116 show that the respective designated bits used for the purpose of identifying the issue groups to which instructions 6 and 7 respectively belong are both According to this known technique for specifying and identifying issue groups, when the designated bit in a particular instruction is a "0", that instruction is the last instruction in the issue group. Referring to the above example, instructions 7 and 6 are in the same issue group with instruction 5 which is the last instruction in that issue group. The reason is that the designated bit in instruction 5 is a "0". Instructions 4 is in the same issue group with instruction 3 which is the last instruction in that issue group. The reason is that the designated bit in instruction 3 is a "0". Instruction 2 is the first and last instruction in an issue group by itself. The reason is that the designated bit in instruction 2 is a "0". Likewise, instruction 1 is in an issue group by itself and the same is the case for instruction 0. The reason is that the respective designated bits in instructions 1 and 0 are both "0".

Thus, as shown in FIG. 1, instructions 7 through 5 are in an issue group referred to by numeral 118; instructions 4 and 3 are in an issue group referred to by numeral 120; instruction 2 is in an issue group by itself which is referred to by numeral 122; instruction 1 is in an issue group by itself which is referred to by numeral 124; and instruction 0 is in an issue group by itself which is referred to by numeral 126. Accordingly, there are a total of five issue groups in the exemplary VLIW packet shown in FIG. 1.

One disadvantage with the above-described known technique for specifying and identifying issue groups in a VLIW packet is that the VLIW processor must be designed to account for the possibility of existence of up to eight issue groups in each VLIW packet. Since each issue group takes one clock cycle for its execution, the VLIW processor must be designed to account for the possibility that it may take anywhere between one and eight clock cycles to complete the execution of all the individual instructions in a single VLIW packet. Manifestly, there is a large degree of uncertainty as to whether a VLIW packet fetched from the memory may take one, two, three, four, five, six, seven, or eight clock cycles for its execution. It also follows that the VLIW processor may have to "wait" anywhere between one and eight clock cycles before the processor can fetch another VLIW packet from the memory. It is also manifest that there is a large degree of uncertainty as to how many clock cycles the VLIW processor must "wait" before a new VLIW packet is fetched from the memory. The uncertainties associated with the number of clock cycles required for execution of a VLIW packet, and also number of clock cycles that the VLIW processor must wait, creates difficulties in designing hardware units such as the fetch and decode logic, the scheduling logic, and the data dependency checking logic of the VLIW processor.

Another disadvantage of the known technique described above is that eight bits must be used to identify the issue groups existing in the VLIW packet. In other words, even if there is merely one or two issue groups in that VLIW packet, eight bits must still be used to identify the issue groups in the VLIW packet. The fact that eight bits are used to identify the issue groups existing in a VLIW packet means that all of the eight individual instructions in a VLIW packet must be scanned in order to determine the existing issue groups in the VLIW packet. The reason is that the value of each respective designated bit in each instruction must be known in order to determine the issue groups existing in the VLIW packet. The need to scan all of the eight instructions in a VLIW packet every time a VLIW packet is fetched results in an undesirable logic complexity.

From the above discussion it is apparent that there is need in the art for a VLIW packet packaging scheme which results in a greater certainty as to the possible number of issue groups in the VLIW packet. Moreover, it is preferable to use fewer than eight bits to designate all the possible issue groups in the VLIW packet and it is also desirable to avoid the need to scan all of the bits and instructions in a VLIW packet to identify the issue groups existing in the VLIW packet.

SUMMARY OF THE INVENTION

The present invention is an apparatus and method for issue grouping of instructions in a VLIW processor. The invention permits one, two, or three issue groups (but no greater than three issue groups) in each VLIW packet. The invention utilizes a template in each VLIW packet. In one embodiment of the invention, the template comprises two issue group end markers where each issue group end marker comprises three bits. The three bits in the first issue group end marker identifies the instruction which is the last instruction in the first issue group. Likewise, the three bits in the second issue group end marker identifies the instruction which is the last instruction in the second issue group.

Any instructions in the VLIW packet falling outside the two expressly defined first and second issue groups are placed in a third issue group. As such, three issue groups can be identified by use of the two issue group end markers. Using a template containing the two issue group end markers, the VLIW packet can have one, two, or three issue groups (but no greater than three issue groups).

In one embodiment of the invention, the template of the VLIW packet includes a chaining bit. The chaining bit is used to "chain" instructions appearing after the last instruction of the last issue group of a first VLIW packet to the instructions in the first issue group of a second VLIW packet. As such, with the aid of the chaining bit, a combined issue group comprising instructions in the first and second VLIW packets can be formed.

In one embodiment, the invention uses a mask generation logic along with other logic blocks to generate an appropriate mask. The generated mask is used to pass through instructions in a VLIW packet which belong to a same issue group for execution in a same clock cycle.

According to the present invention the uncertainty as to the number of clock cycles necessary to execute all of the individual instructions in a VLIW packet is substantially reduced since there can be no more than three issue groups in the VLIW packet. Moreover, one embodiment of the invention utilizes only six bits, i.e. two end markers each having three bits, to identify all the issue groups in a VLIW packet. Accordingly, fewer than eight bits are used to identify all issue groups in a VLIW packet and also there is no need to scan the entire VLIW packet and each individual instruction in the VLIW packet to identify all the issue groups existing in a VLIW packet.

The fact that the issue grouping information is entirely confined to the template in the VLIW packet permits the VLIW processor to extract the issue grouping information quickly with a simple mask instead of having to extract the issue grouping information in bits from diverse bit positions in the VLIW packet. Thus, the invention optimizes the speed and power consumption associated with various hardware units of the VLIW processor such as the fetch and decode logic, the scheduling logic, and the data dependency checking logic.

Moreover, according to the present invention, as a result of limiting the number of issue groups in a VLIW packet to a maximum of three, each VLIW packet may take a maximum of three clock cycles to execute. This results in a simpler fetch and decode logic since the fetch and decode logic does not have to accommodate situations where there are four, five, six, seven, or eight issue groups in a single VLIW packet.

Further, since the number of issue groups in the present invention is limited to three, the logic used for the chaining of instructions from a first VLIW packet to an issue group in a second VLIW packet is also simpler since the chaining takes place either from the last instruction in the second issue group of the first VLIW packet or from the last instruction in the third issue group of the first VLIW packet. However, in other VLIW processor designs, chaining could take place from the last instruction in the second issue group, the last instruction in the third issue group, the last instruction in the fourth issue group, the last instruction in the fifth issue group, the last instruction in the sixth issue group, or the last instruction in the seventh issue group. To accommodate this wide range of chaining possibilities, the hardware unit for data dependency checking and the hardware for forwarding instructions to execution units in those other VLIW processors are more complex, slower, and consume more power.

DETAILED DESCRIPTION OF THE INVENTION

The present invention is an apparatus and method for issue grouping of instructions in a VLIW processor. The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 2:
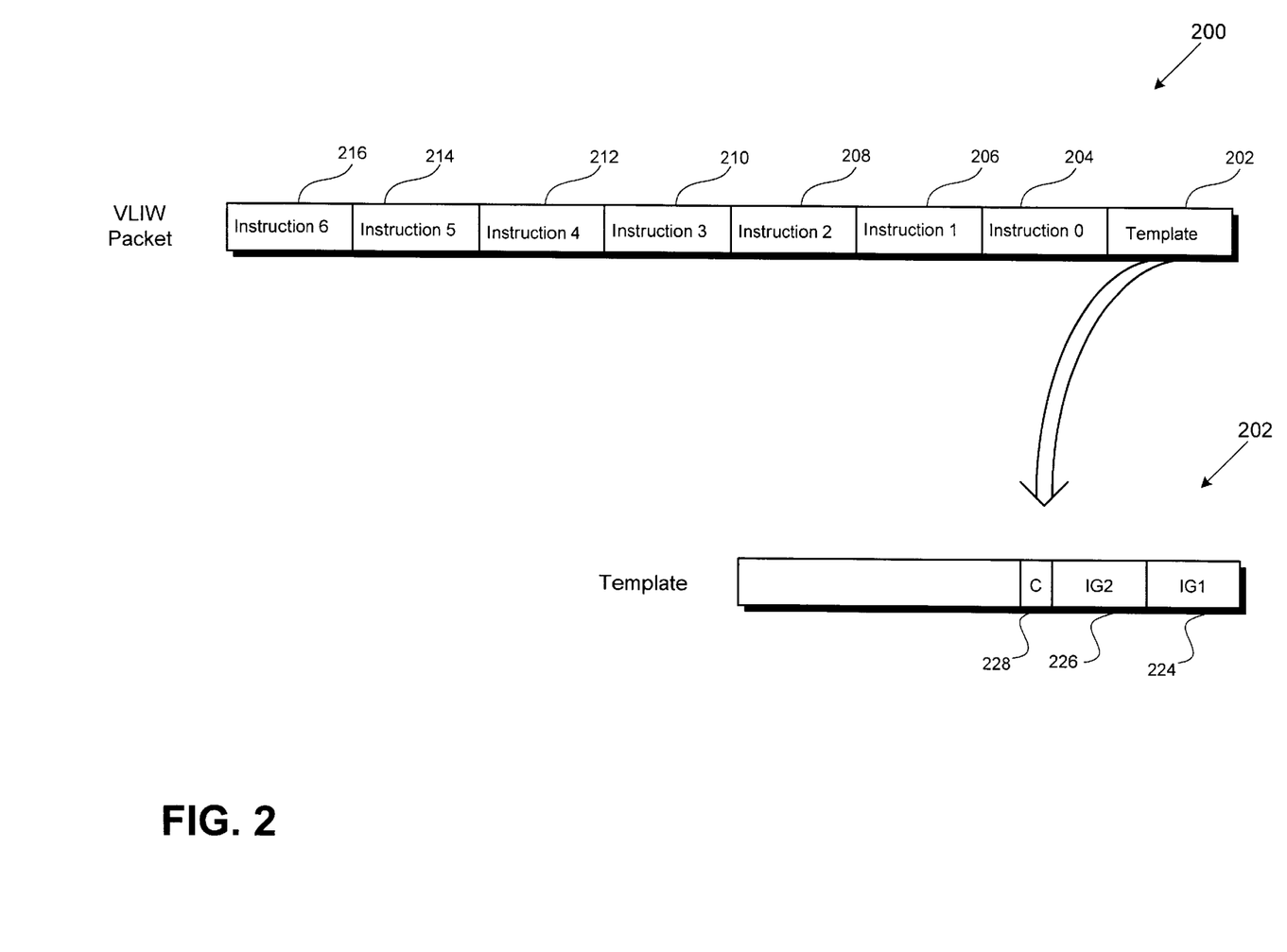
FIG. 2 generally shows an embodiment of the invention's VLIW packet and a template including issue group end marker slots.

FIG. 2 illustrates one embodiment of the present invention. FIG. 2 shows VLIW packet 200 which comprises template 202 and a number of individual instructions within VLIW packet 200. It is noted that for ease of reference, each of the "individual instructions" within a VLIW packet is also referred to simply as an "instruction" in the present application. Moreover, a VLIW packet, such as VLIW packet 200, is also referred to as a "packet of instructions" in the present example. The invention is flexible as to the permissible number of the individual instructions in the VLIW packet. For example, it is permissible for the VLIW packet to have four or more individual instructions. In the specific example shown in FIG. 2, VLIW packet 200 has seven individual instructions. Those individual instructions are instruction 0 in instruction slot 204, instruction 1 in instruction slot 206, instruction 2 in instruction slot 208, instruction 3 in instruction slot 210, instruction 4 in instruction slot 212, instruction 5 in instruction slot 214, and instruction 6 in instruction slot 216.

In the example embodiment of the invention shown in FIG. 2, template 202 is comprised of 16 bits. However, it is appreciated that the number of bits in template 202 is a matter of design choice and can be varied without departing from the scope of the present invention. For example, template 202 may comprise five bits, eight bits, or 24 bits or more. Moreover, in the example embodiment of the invention shown in FIG. 2, each instruction 0 through 6 is also comprised of 16 bits. However, the number of bits in each individual instruction 0 through 6 is a matter of design choice and can be different for different VLIW processors. For example, each individual instruction 0 through 6 may be 16 bits, 32 bits, or 41 bits. Moreover, while some of the individual instructions in a particular VLIW packet may be of a certain length, other individual instructions in the same VLIW packet may be of a different length. By way of example, while one of the individual instructions in a particular VLIW packet may be 16 bits, another individual instruction in the same VLIW packet may be 32 bits.

FIG. 2 also shows an expanded view of template 202. As seen in FIG. 2, template 202 comprises a first "issue group end marker" slot 224 and a second "issue group end marker" slot 226, and "chaining bit" slot 228. In the example embodiment of the invention shown in FIG. 2, each of the first and second issue group end marker slots 224 and 226 is three bits long. However, the number of bits in each issue group end marker slot is a matter of design choice and can be different for different VLIW processors. Chaining bit slot 228 is typically comprised of a single bit.

It is noted that according to the present invention, a VLIW packet can be divided to no more than three issue groups.

Thus, the present invention substantially reduces the uncertainty of, and the associated design problems associated with the uncertainty of, how many clock cycles a particular VLIW packet may take to complete its execution. As explained in more detail below, template 202 in VLIW packet 200 contains information that can be used to divide up the VLIW packet into one, two, or three issue groups, but no greater than three issue groups. The first issue group end marker in slot 224 of template 202 indicates which individual instructions in VLIW packet 200 are in the first issue group while the second issue group end marker in slot 226 of template 202 indicates which individual instructions in VLIW packet 200 are in the second issue group. The remaining instructions in VLIW packet 200, if any, would then be in the third issue group. Thus, a separate issue group end marker for identifying which individual instructions in VLIW packet 200 are in the third issue group is not required. As explained in more detail below, using the above scheme, the invention enables VLIW packet 200 to have one, two, or three issue groups, but no greater than three issue groups.

Figure 3:
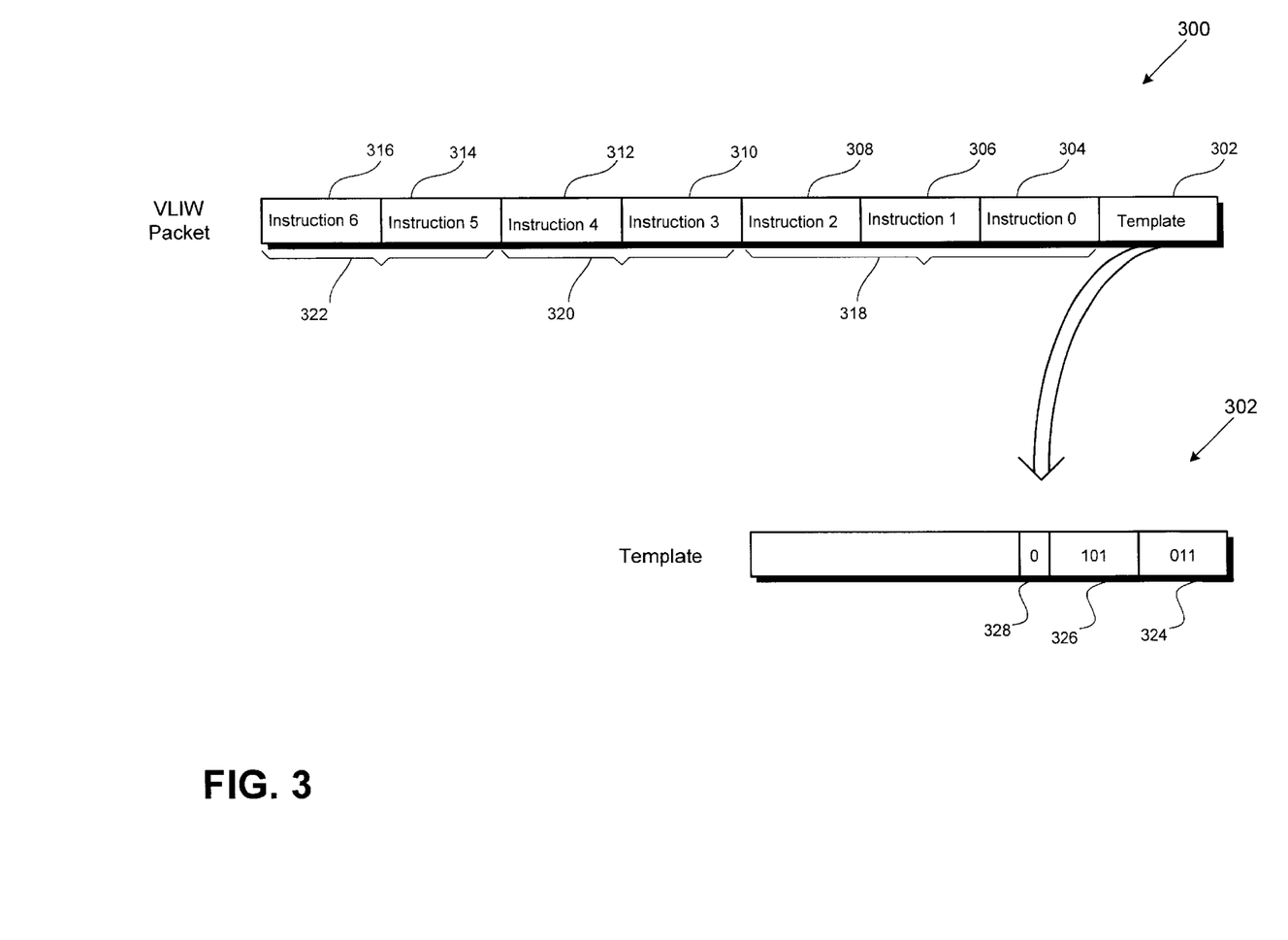
FIG. 3 shows one specific example of the invention's VLIW packet and a template including issue group end marker slots.

By reference to FIG. 3, a specific example for explaining the present embodiment of the invention is now discussed. FIG. 3 shows VLIW packet 300 comprising template slot 302 and instruction slots 304, 306, 308, 310, 312, 314, and 316. As seen in VLIW packet 300 in FIG. 3, instruction 0 is in instruction slot 304, instruction 1 is in instruction slot 306, instruction 2 is in instruction slot 308, instruction 3 is in instruction slot 310, instruction 4 is in instruction slot 312, instruction 5 is in instruction slot 314, and instruction 6 is in instruction slot 316. Like the example shown in FIG. 2, template 302 in VLIW packet 300 comprises 16 bits while each individual instruction 0 through 6 also comprises 16 bits.

FIG. 3 also shows template 302 having a first issue group end marker slot 324, a second issue group end marker slot 326, and chaining bit slot 328. Like FIG. 2, in the example shown in FIG. 3 each issue group end marker slot 324 or 326 is three bits wide while chaining bit slot 328 is one bit wide. In the example shown in FIG. 3, the first issue group end marker slot 324 contains bits "011" (i.e. a decimal 3) while the second issue group end marker slot 326 contains bits "101" (i.e. a decimal 5). As shown in template 302, chaining bit slot 328 contains a "0". The actual bit pattern in each issue group end marker slot is referred to as an issue group end marker or simply an "end marker" in the present application.

Continuing with this example, the three bits contained in the first issue group end marker 324, i.e. "011" (or decimal 3), indicate that the third instruction in VLIW packet 300 is the "end" of the first issue group in VLIW packet 300. In other words, issue group end marker 324 indicates that instruction 0 in instruction slot 304, instruction 1 in instruction slot 306, and instruction 2 in instruction slot 308 are in the first issue group. The first issue group, containing instructions 0 through 2, is generally referred to by numeral 318 in FIG. 3. Similarly, the three bits contained in the second issue group end marker 326, i.e. "101" (or decimal 5), indicate that the fifth instruction in VLIW packet 300 is the "end" of the second issue group in VLIW packet 300. In other words, issue group end marker 326 indicates that instruction 3 in instruction slot 310 and instruction 4 in instruction slot 312 are in the second issue group. The second issue group, containing instructions 3 and 4, is generally referred to by numeral 320 in FIG. 3. Although there is no end marker in template 302 for the third issue group, according to the invention the remaining instructions in VLIW packet 300 belong to the third issue group. In other words, instruction 5 in instruction slot 314 and instruction 6 in instruction slot 316 comprise the third issue group. The third issue group, containing instructions 5 and 6, is generally referred to by numeral 322 in FIG. 3.

Thus, in the particular example given with reference to FIG. 3, VLIW packet 300 is divided up into three issue groups. A first issue group comprising instructions 0 through 2, a second issue group comprising instructions 3 and 4, and a third issue group comprising instructions 5 and 6. According to this example, instructions 0 through 2 can be forwarded to their respective execution units and be executed in a first clock cycle. Likewise, instructions 3 and 4 can be forwarded to their respective execution units and be executed in a second clock cycle. In a third clock cycle, instructions 5 and 6 can be forwarded to their respective execution units and be executed. Thus, in this example, execution of all the individual instructions 0 through 6 in VLIW packet 300 would take three clock cycles.

It is noted that the present invention accommodates crossing packet boundaries and combining individual instructions in a first VLIW packet with individual instructions in a second (i.e. a subsequent) VLIW packet to form an issue group. In other words, one or more individual instructions in a first VLIW packet can be "chained" to individual instructions in a second VLIW packet to form an issue group. In the specific example given in FIG. 3, the chaining bit contained in chaining bit slot 328 in template 302 is a "0". Thus, there is no chaining of any of the individual instructions in VLIW packet 300 to any of the individual instructions in a subsequent VLIW packet. The manner in which the chaining bit is used to "chain" one or more individual instructions in a first VLIW packet to one or more individual instructions in a second VLIW packet is explained in a later section of the present application where the chaining bit is a "1".

Figure 4:
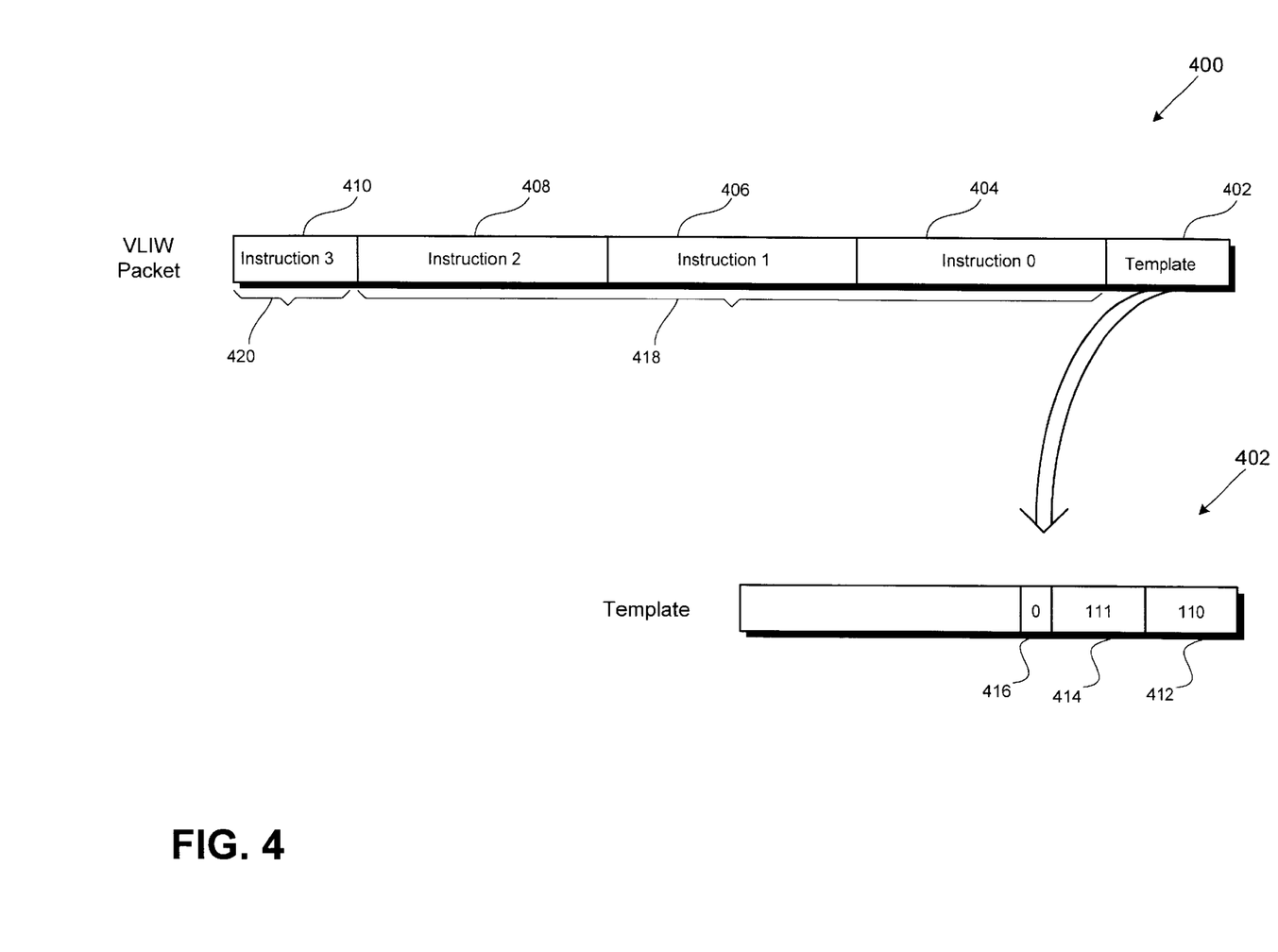
FIG. 4 shows another specific example of the invention's VLIW packet and a template including issue group end marker slots.

By reference to FIG. 4, another specific example for explaining the present embodiment of the invention is now discussed. FIG. 4 shows VLIW packet 400 comprising template slot 402 and instruction slots 404, 406, 408, and 410. As seen in VLIW packet 400 in FIG. 4, instruction 0 is in instruction slot 404, instruction 1 is in instruction slot 406, instruction 2 is in instruction slot 408, and instruction 3 is in instruction slot 410. Like the examples shown in FIGS. 2 and 3, template 402 in VLIW packet 400 comprises 16 bits. However, unlike the examples shown in FIGS. 2 and 3, instructions 0 through 2 in VLIW packet 400 are "long" instructions, each comprising 32 bits while instruction 3 comprises only 16 bits.

FIG. 4 also shows template 402 having a first issue group end marker slot 412, a second issue group end marker slot 414, and chaining bit slot 416. In the example shown in FIG. 4, the first issue group end marker slot 412 contains bits "110" (i.e. a decimal 6) while the second issue group end marker slot 414 contains bits "111" (i.e. a decimal 7). As shown in template 402, chaining bit slot 416 contains a "0".

Continuing with this example, the three bits contained in the first issue group end marker 412, i.e. "110" (or decimal 6), indicate that a sixth short instruction, which is equivalent to the third long instruction in VLIW packet 400, is the "end" of the first issue group in VLIW packet 400. In other words, issue group end marker 412 indicates that long instruction 0 in instruction slot 404, long instruction 1 in instruction slot 406, and long instruction 2 in instruction slot 408 are in the first issue group. The first issue group, containing long instructions 0 through 2, is generally referred to by numeral 418 in FIG. 4. Similarly, the three bits contained in the second issue group end marker 414, i.e. "111" (or decimal 7), indicate that a seventh short instruction, which is equivalent to the fourth instruction in VLIW packet 400, is the "end" of the second issue group in VLIW packet 400. In other words, issue group end marker 414 indicates that (short) instruction 3 in instruction slot 420 is in the second issue group. The second issue group, containing only instruction 3, is generally referred to by numeral 420 in FIG. 4. Although there is no end marker in template 402 for the third issue group, according to the invention any remaining instructions in VLIW packet 400 belong to the third issue group. However, instruction 3 is the last instruction in VLIW packet 400. Accordingly, VLIW packet 400 does not have a third issue group and it (i.e. VLIW packet 400) consists of only two issue groups.

Thus, in the particular example given with reference to FIG. 4, VLIW packet 400 is divided up into two issue groups. A first issue group comprising long instructions 0 through 2 and a second issue group comprising short instruction 3. According to this example, long instructions 0 through 2 can be forwarded to their respective execution units and be executed in a first clock cycle. Likewise, short instruction 3 can be forwarded to its respective execution unit and be executed in a second clock cycle. Thus, in this example, execution of all the individual instructions 0 through 3 in VLIW packet 400 would take two clock cycles.

As with the example given with reference to FIG. 3, in the specific example given in FIG. 4, the chaining bit contained in chaining bit slot 416 in template 402 is a "0". Thus, there is no chaining of any of the individual instructions in VLIW packet 400 to any of the individual instructions in a subsequent VLIW packet. The manner in which the chaining bit is used to "chain" one or more individual instructions in a first VLIW packet to one or more individual instructions in a second VLIW packet is explained in the following example.

Figure 5:
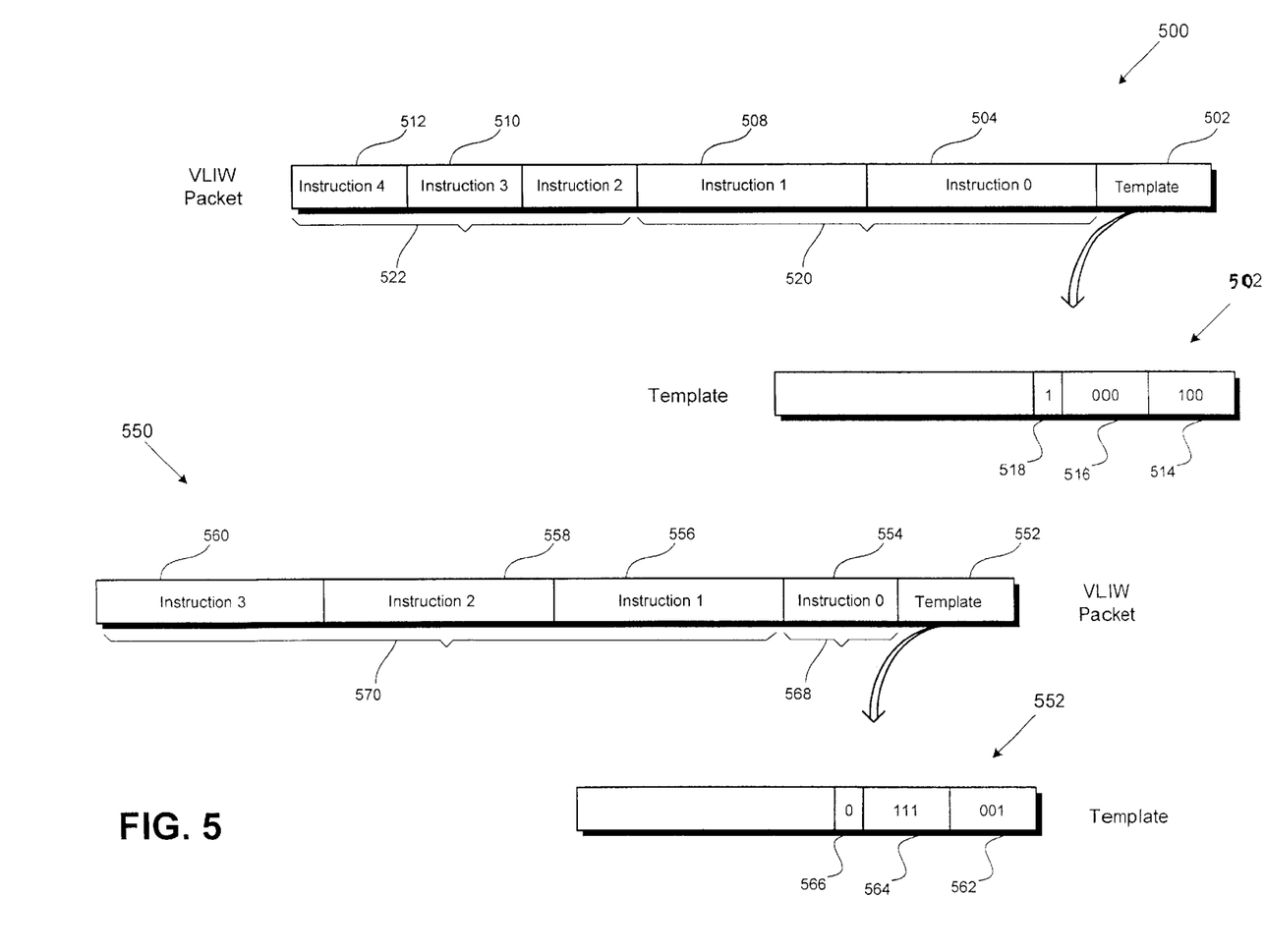
FIG. 5 shows specific examples of first and second VLIW packets where certain instructions in the first VLIW packet are chained to certain instructions in the second VLIW packet in accordance with one embodiment of the invention.

By reference to FIG. 5, another specific example for explaining the present embodiment of the invention is discussed. Unlike the examples discussed in relation to FIGS. 3 and 4, in the example discussed in relation to FIG. 5, the chaining bit is equal to "1". FIG. 5 shows VLIW packet 500 comprising template slot 502 and instruction slots 504, 506, 508, 510, and 512. As seen in VLIW packet 500 in FIG. 5, long instruction 0 is in instruction slot 504, long instruction 1 is in instruction slot 506, short instruction 2 is in instruction slot 508, short instruction 3 is in instruction slot 510, and short instruction 4 is in instruction slot 512. Template 502 in VLIW packet 500 comprises 16 bits while each one of the individual long instructions 0 and 1 comprises 32 bits and each one of the individual short instructions 2 through 4 comprises 16 bits.

FIG. 5 also shows template 502 having a first issue group end marker slot 514, a second issue group end marker slot 516, and chaining bit slot 518. In the example shown in FIG. 5, the first issue group end marker slot 514 contains bits "100" (i.e. a decimal 4) while the second issue group end marker slot 516 contains bits "000". As shown in template 502, chaining bit slot 518 contains a "1".

Since the chaining bit in the present example is a "1", certain individual instructions in VLIW packet 500 and certain other individual instructions in the subsequent VLIW packet, shown as VLIW packet 550 in FIG. 5, must be placed in a combined issue group. According to the present invention, an issue group which is entirely confined to VLIW packet 500 is identified by an end marker which designates one of the instructions in VLIW packet 500 as the last instruction in that issue group. In the present example, first issue group end marker slot 514 indicates that the last instruction in the first issue group is a fourth short instruction, which is equivalent to the second long instruction in VLIW packet 500, i.e. instruction 1 in VLIW packet 500. Thus, the first issue group which is confined entirely to VLIW packet 500 consists of individual long instructions 0 and 1. Long instructions 0 and 1 in VLIW packet 500 are generally referred to by numeral 520 in FIG. 5.

According to the invention when an issue group end marker is a "000", all instructions after the last instruction in the previous issue group of a VLIW packet are to be chained to instructions in a subsequent VLIW packet. In the present example, to indicate that all instructions after the last instruction in the first issue group in VLIW packet 500 are to be chained to certain instructions in VLIW packet 550, the second issue group end marker in VLIW packet 500 (which is in slot 516 of template 502) contains bits "000". Thus, instructions in VLIW packet 500 appearing after the last instruction of the first issue group, i.e. instructions in VLIW packet 500 appearing after instruction 1, must be chained to certain other instructions in VLIW packet 550. Therefore, short instructions 2, 3, and 4 in VLIW packet 500 must be chained to certain other instructions in VLIW packet 550 to form a combined issue group.

Continuing with the present example, FIG. 5 shows VLIW packet 550 comprising template slot 552 and instruction slots 554, 556, 558 and 560. As seen in VLIW packet 550 in FIG. 5, short instruction 0 is in instruction slot 554, long instruction 1 is in instruction slot 556, long instruction 2 is in instruction slot 558, and long instruction 3 is in instruction slot 560. Template 552 in VLIW packet 550 comprises 16 bits while individual short instruction 0 also comprises 16 bits. However, in the exemplary VLIW packet 550 shown in FIG. 5, each one of the individual long instructions 1 through 3 comprises 32 bits.

FIG. 5 also shows template 552 having a first issue group end marker slot 562, a second issue group end marker slot 564, and chaining bit slot 566. In the example shown in FIG. 5, the first issue group end marker slot 562 contains bits "001" (i.e. a decimal 1) while the second issue group end marker slot 564 contains bits "111" (i.e. a decimal 7). As shown in template 552, chaining bit slot 566 contains a "0".

Since the first issue group end marker slot 562 contains bits "001", the first instruction in VLIW packet 550 (i.e. short instruction 0) is also the last instruction in the first issue group of VLIW packet 550. However, since the chaining bit in the previous VLIW packet, i.e. in VLIW packet 500, was equal to a "1", the first issue group of VLIW packet 550 includes, in addition to short instruction 0 of VLIW packet 550, those instructions in VLIW packet 500 which do not belong to the last issue group of VLIW packet 500. Thus, the first issue group of VLIW packet 550 is comprised of short instructions 2, 3, and 4 of VLIW packet 500 in addition to short instruction 0 of VLIW packet 550. Short instructions 2, 3, and 4 in VLIW packet 500 are generally referred to by numeral 522 while short instruction 0 in VLIW packet 550 is generally referred to by numeral 568 in FIG. 5.

As seen in template 552, the second issue group end marker slot contains bits "111" (i.e. a decimal 7). Thus, the second issue group ends with a seventh short instruction, which is equivalent to the last long instruction (i.e. long instruction 3) in VLIW packet 550. Thus, the second issue group in VLIW packet 550, comprising long instructions 1, 2, and 3, is the last issue group in that packet. Moreover, since the chaining bit in slot 566 of template 552 is equal to a "0", long instructions 1, 2, and 3, in the second (and last) issue group in VLIW packet 550 are not chained to any instructions in a subsequent VLIW packet.

Thus, in the particular example given with reference to FIG. 5, long instructions 0 and 1 in VLIW packet 500 comprise one issue group. Since the chaining bit in template 502 of VLIW packet 500 is equal to a "1", short instructions 2, 3, and 4 in VLIW packet 500 and short instruction 0 in VLIW packet 550 comprise a separate combined issue group and finally long instructions 1, 2, and 3 in VLIW packet 550 comprise yet another issue group. According to this example, long instructions 0 and 1 in VLIW packet 500 can be forwarded to their respective execution units and be executed in a first clock cycle. Short instructions 2, 3, and 4 in VLIW packet 500 along with short instruction 0 in VLIW packet 550 and can be forwarded to their respective execution units and be executed in a second clock cycle. Finally, long instructions 1, 2, and 3 in VLIW packet 550 can be forwarded to their respective execution units and be executed in a third clock cycle.

As explained above, by use of a chaining bit in the template of the VLIW packet the invention permits crossing packet boundaries so that individual instructions from a first VLIW packet and individual instructions from a second VLIW packet can together form a combined issue group. The ability to form a combined issue group using instructions from two different VLIW packets provides greater flexibility in programming and using the VLIW processor and also provides greater flexibility in the architecture and logic design of the VLIW processor.

From the specific examples discussed in relation to FIGS. 3, 4, and 5, it is apparent that according to the present invention there can be one, two, or three issue groups (but no greater than three issue groups) in each VLIW packet. In the exemplary VLIW processor discussed above, there can be at most seven individual (short) instructions in a VLIW packet. In this exemplary VLIW processor, when the first issue group end marker slot in a VLIW packet template contains bits "111", all of the seven individual instructions in the VLIW packet would be in the first issue group which would also be the only issue group in that particular VLIW packet. When the first issue group end marker slot in a VLIW packet template contains a binary number lower than "111" and the second issue group end marker slot contains the binary number "111", the second issue group would be the last issue group in the VLIW packet and as such there would be a total of two issue groups in that particular VLIW packet.

When the first and second issue group end markers are both a binary number lower than "111" and the second issue group end marker is a binary number greater than the first issue group end marker, there would be a third issue group containing those individual instructions which are not in either the first or the second issue groups. From the above examples and discussions it is manifest that the invention permits up to three issue groups but no greater than three issue groups in each VLIW packet.

Because of the fact that the invention permits one, two, or three issue groups (but no greater than three issue groups) in each VLIW packet, there is substantially less uncertainty as to the number of clock cycles necessary to execute all of the individual instructions in a VLIW packet. Because of this reduced uncertainty as to the number of clock cycles necessary to execute all of the individual instructions in a VLIW packet, hardware units such as the fetch and decode logic, the scheduling logic, and the data dependency checking logic of the VLIW processor are easier to design.

From the above discussions and examples it is also apparent that the exemplary embodiment of the invention discussed in the present application utilizes merely six bits to identify all of the issue groups existing in the VLIW packet. This is in contrast to known techniques discussed above which require eight bits to identify all of the issue groups in the VLIW packet. Moreover, unlike the known techniques discussed above, the invention does not require a scan of all of the bits and instructions in the VLIW packet in order to identify the issue groups existing in the VLIW packet. The fact that such a "scan" of all of the bits and instructions in the VLIW packet is not required results in a further reduction of logic complexity.

Figure 6:
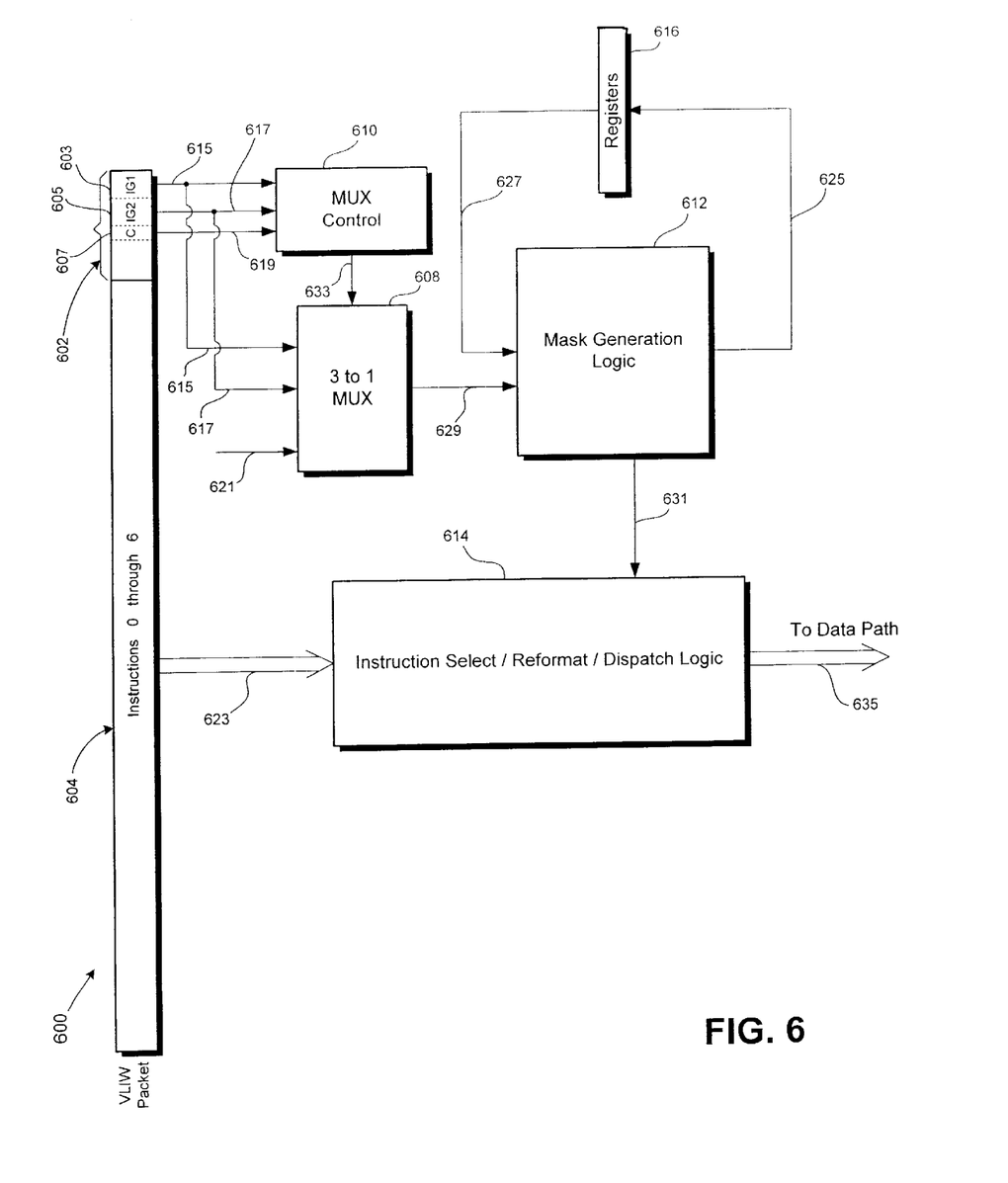
FIG. 6 shows an exemplary and conceptual block diagram for implementing an embodiment of the invention where the VLIW packet contains seven instructions and where the chaining bit is equal to "0".

Referring to FIG. 6, an exemplary and conceptual block diagram for implementing the present invention is shown. It is manifest to a person of ordinary skill in the art that the invention can be implemented in a number of ways other than by the exemplary block diagram shown in FIG. 6. Moreover, in the block diagram of FIG. 6 an exemplary VLIW packet 600 comprising seven individual instructions is used. A generic block diagram for implementing the invention when there are fewer or greater number of individual instructions in the VLIW packet is not shown. However, such a generic block diagram is similar to that shown in FIG. 6 and can be implemented by a person of ordinary skill in the art in light of the block diagram shown in FIG. 6 and the related discussion below. Moreover, the conceptual block diagram shown in FIG. 6 has also been simplified to discuss an example where the chaining bit in VLIW packet 600 is equal to "0".

Continuing with the exemplary and conceptual block diagram in FIG. 6, the exemplary VLIW packet 600 comprises instructions 0 through 6 which are generally referred to by numeral 604 and a template generally referred to by numeral 602. In the exemplary VLIW packet 600, each one of the instructions 0 through 6 is 16 bits long while template 602 is also 16 bits long. Template 602 is shown as having a first issue group end marker slot 603 and a second issue group end marker slot 605 and a chaining bit slot 607. As stated above, in the exemplary VLIW processor described in the present application, each of the first and second issue group end marker slots 603 and 605 contain three bits while chaining bit slot 607 contains a single bit.

As shown in FIG. 6, first and second issue group end marker slots 603 and 605 are coupled to 3 to 1 MUX 608 via three-bit wide line 615 and three-bit wide line 617 respectively. Three-bit wide line 621 is also coupled to 3 to 1 MUX 608. In the present example, where VLIW packet 600 has seven individual instructions, line 621 provides a constant binary number "111" (i.e. a decimal 7) to 3 to 1 MUX 608. First issue group end marker slot 603, second issue group end marker slot 605, and chaining bit slot 607 are coupled to MUX Control 610 via three-bit wide line 615, three-bit wide line 617, and one-bit wide line 619, respectively. MUX Control 610 provides an output to 3 to 1 MUX 608 via three-bit wide line 633. 3 to 1 MUX 608 provides its output to Mask Generation Logic 612 via three-bit wide line 629. Mask Generation Logic 612 provides an output to Instruction Select/Reformat/Dispatch Logic 614 via seven-bit wide line 631. Mask Generation Logic 612 also provides an output to Registers 616 via seven-bit wide line 625. Registers 616 in turn provide an output back to Mask Generation Logic 612 via seven-bit wide line 627. VLIW packet 600 is coupled to Instruction Select/Reformat/Dispatch Logic 614 via bus 623. Finally, the output of Instruction Select/Reformat/Dispatch Logic 614 is provided to a data path of the VLIW processor via bus 635.

In operation, line 615 provides the three bits in first issue group end marker slot 603 to MUX Control 610 while line 617 provides the three bits in the second issue group end marker slot 605 to MUX Control 610. In addition, the chaining bit in slot 607 is provided to MUX Control 610 via line 619. As stated above, the conceptual block diagram shown in FIG. 6 is directed to an example where the chaining bit is a "0". For the purpose of the present example, the three bits in first issue group end marker slot 603 are "010" (i.e. a decimal 2) while the three bits in second issue group end marker slot 605 are "100" (i.e. a decimal 4) and, as stated above, the chaining bit in chaining bit slot 607 is a "0".

MUX Control 610 provides a binary "001" on a three-bit wide line 633 to 3 to 1 MUX 608 during a first clock cycle. In response to the binary "001" received from MUX Control 610, 3 to 1 MUX 608 selects the "first" input of the 3 to 1 MUX which is the input provided on the three-bit wide line 615. As shown in FIG. 6, the three-bit wide line 615 is coupled to first issue group end marker slot 603 and provides the three bits present in first issue group end marker slot 603 as the "first" input of 3 to 1 MUX 608.

Thus, during the first clock cycle, the three bits in the first issue group end marker slot 603 are selected by 3 to 1 MUX 608 and provided to Mask Generation Logic 612 through the three-bit wide line 629.

Mask Generation Logic 612 uses the three bits provided on line 629 to generate a mask to eliminate those instructions which are not part of the first issue group and to pass through those instructions which are part of the first issue group. In the present example, first issue group end marker slot contains bits "010" (i.e. a decimal 2). As stated above, during the first clock cycle those bits (i.e. bits "010") are passed to Mask Generation Logic 612 via the three-bit wide line 629. In response to the binary number provided via the three-bit line 629 (i.e. "010") and since in the present example the Mask Generation Logic 612 "knows" that there is a total of seven individual instructions in VLIW packet 600, Mask Generation Logic 612 outputs a seven-bit mask "0000011" on line 631 to Instruction Select/Reformat/Dispatch Logic 614. The seven-bit mask "0000011" (whose first two bits are both a "1") causes the first two individual instructions in VLIW packet 600 which correspond to the first two bits in the mask to pass through to a data path of the VLIW processor via bus 635. Thus, in the first clock cycle, individual instructions 0 and 1 in VLIW packet 600 are passed to a data path of the VLIW processor and as such instructions 0 and 1 are issued as the first issue group of VLIW packet 600.

Continuing with the description of the exemplary and conceptual block diagram in FIG. 6, during a second clock cycle, MUX Control 610 provides a binary "010" on the three-bit wide line 633 to 3 to 1 MUX 608. In response to the binary "010" received from MUX Control 610, 3 to 1 MUX 608 selects the "second" input of the 3 to 1 MUX which is the input provided on the three-bit wide line 617. As shown in FIG. 6, the three-bit wide line 617 is coupled to second issue group end marker slot 605 and provides the three bits present in second issue group end marker slot 605 as the "second" input of 3 to 1 MUX 608. Thus, during the second clock cycle, the three bits in the second issue group end marker slot 605 are selected by 3 to 1 MUX 608 and provided to Mask Generation Logic 612 via the three-bit wide line 629.

Mask Generation Logic 612 uses the three bits provided on line 629 to generate a mask to eliminate those instructions which are not part of the second issue group and passes through those instructions which are part of the second issue group. In the present example, second issue group end marker slot contains bits "100" (i.e. a decimal 4). As stated above, during the second clock cycle those bits (i.e. bits "100") are passed to Mask Generation Logic 612 via the three-bit wide line 629. In response to the binary number provided via the three-bit line 629 (i.e. "100") and since in the present example the Mask Generation Logic 612 "knows" that there is a total of seven individual instructions in VLIW packet 600, Mask Generation Logic 612 outputs a seven-bit mask "0001100" on line 631 to Instruction Select/Reformat/Dispatch Logic 614. The seven-bit mask "0001100" (whose third and fourth bits are both a "1") causes individual instructions 2 and 3 in VLIW packet 600 which correspond to the third and fourth bits in the mask to pass through to a data path of the VLIW processor via bus 635. Thus, in the second clock cycle, individual instructions 2 and 3 in VLIW packet 600 are passed to a data path of the VLIW processor and as such instructions 2 and 3 are issued as the second issue group of VLIW packet 600.

Continuing with the description of the exemplary and conceptual block diagram in FIG. 6, during a third clock cycle, MUX Control 610 provides a binary "100" on the three-bit wide line 633 to 3 to 1 MUX 608. In response to the binary "100" received from MUX Control 610, 3 to 1 MUX 608 selects the "third" input of the 3 to 1 MUX which is the input provided on the three-bit wide line 621. In the present example, where the VLIW packet has seven individual instructions, the three-bit wide line 621 provides a constant binary "111" (i.e. a decimal 7) to 3 to 1 MUX 608 as the "third" input of 3 to 1 MUX 608. Thus, during the third clock cycle the three bits "111" are provided to Mask Generation Logic 612 via the three-bit wide line 629.

Mask Generation Logic 612 uses the three bits provided on line 629 to generate a mask to eliminate those instructions which are not part of the third issue group and passes through those instructions which are part of the third issue group. As stated above, during the third clock cycle the three bits "111" are passed to Mask Generation Logic 612 via the three-bit wide line 629. In response to this binary number provided via the three-bit line 629 (i.e. "111") and since in the present example the Mask Generation Logic 612 "knows" that there is a total of seven individual instructions in VLIW packet 600, Mask Generation Logic 612 outputs a seven-bit mask "1110000" on line 631 to Instruction Select/Reformat/Dispatch Logic 614. The seven-bit mask "1110000" (whose fifth, sixth, and seventh bits are "1") causes individual instructions 4, 5, and 6 in VLIW packet 600 which correspond respectively to fifth, sixth, and seventh bits in the mask to pass through to a data path of the VLIW processor via bus 635. Thus, in the third clock cycle, individual instructions 4, 5, and 6 in VLIW packet 600 are passed to a data path of the VLIW processor and as such instructions 4, 5, and 6 are issued as the third issue group of VLIW packet 600.

As stated above, Mask Generation Logic 612 generates appropriate masks to be used by Instruction Select/Reformat/Dispatch Logic 614 to form the desired issue groups of instructions. As further stated above, during the first clock cycle, Mask Generation Logic 612 receives the three bits "010" via line 629. Since, in the present example, there are a total of seven individual instructions in the VLIW packet, Mask Generation Logic 612 generates the seven-bit pattern "0000011" during the first clock cycle. This seven-bit pattern is outputted on line 631 and also on line 625.

Registers 616 store the seven-bit pattern outputted by Mask Generation Logic 612 on line 625. During the second clock cycle, Mask Generation Logic 612 uses the value stored in Registers 616 in order to determine what the first instruction in the second issue group should be. As explained above, 3 to 1 MUX 608 identifies to Mask Generation Logic 612 via line 629 which instruction in VLIW packet 600 is the last instruction in the second issue group. However, the first instruction in the second issue group must also be made known to Mask Generation Logic 612. This is done by using Registers 616 to identify the last instruction in the first issue group to Mask Generation Logic 612 via line 627. Likewise, during the third clock cycle, Registers 616 are used in a similar manner to identify the last instruction in the second issue group to Mask Generation Logic 612 so that the first instruction in the third issue group is made known to Mask Generation Logic 612.

As stated above, in the block diagram of FIG. 6 an exemplary VLIW packet 600 comprising seven individual instructions was used. A generic block diagram for implementing the invention when there are fewer or greater number of individual instructions in the VLIW packet is not shown. However, such a generic block diagram is similar to that shown in FIG. 6 and can be implemented by a person of ordinary skill in the art in light of the block diagram shown in FIG. 6 and the related discussion above. Moreover, the conceptual block diagram shown in FIG. 6 has also been simplified for discussing an example where the chaining bit in the VLIW packet is equal to "0".

The fact that the issue grouping information is entirely confined to the template in the VLIW packet permits the VLIW processor to extract the issue grouping information quickly with a simple mask instead of having to extract the issue grouping information in bits from diverse bit positions in the VLIW packet. In designs where the VLIW processor is forced to glean the issue grouping information from diverse bit positions in the VLIW packet additional power is consumed since long and more capacitive interconnect lines are used to access the diverse bit positions in the VLIW packet. Also, due to the larger interconnect capacitance, there is greater delay in extracting issue grouping information when such information is spread across the VLIW packet instead of being contained in a template field. Thus, the invention optimizes the speed and power consumption associated with various hardware units of the VLIW processor such as the fetch and decode logic, the scheduling logic, and the data dependency checking logic.

Moreover, according to the present invention, as a result of limiting the number of issue groups in a VLIW packet to a maximum of three, each VLIW packet may take a maximum of three clock cycles to execute. According to other known designs, a VLIW packet may take a maximum of eight clock cycles to execute since the number of issue groups in each VLIW packet can be as great as the number of instructions; and the number of instructions in a VLIW packet can be as high as eight. In contrast, according to the invention there can be one, two, or three issue groups in a given VLIW packet. This results in a simpler fetch and decode logic since the fetch and decode logic does not have to accommodate situations where there are four, five, six, seven, or eight issue groups in a single VLIW packet.

Moreover, since the number of issue groups in the present invention is limited to three, the logic used for the chaining of instructions from a first VLIW packet to an issue group in a second VLIW packet is also simpler since the chaining takes place either from the last instruction in the second issue group of the first VLIW packet or from the last instruction in the third issue group of the first VLIW packet. However, in other VLIW processor designs, chaining could take place from the last instruction in the second issue group, the last instruction in the third issue group, the last instruction in the fourth issue group, the last instruction in the fifth issue group, the last instruction in the sixth issue group, or the last instruction in the seventh issue group. To accommodate this wide range of chaining possibilities, the hardware unit for data dependency checking and the hardware for forwarding instructions to execution units in those other VLIW processors are more complex, slower, and consume more power.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, an apparatus and method for issue grouping of instructions in a VLIW processor has been described.

What is claimed is:

1. A processor comprising:
   a first plurality of instructions in a packet of instructions in said processor;
   an issue group in said packet;
   a template in said packet, said template including an end marker;
   said end marker identifying a second plurality of said instructions in said packet, said issue group comprising said second plurality of said instructions, said second plurality being equal to or less than said first plurality.

2. The processor of claim 1 wherein said first plurality is equal to seven.

3. The processor of claim 1 wherein said packet comprises at least 128 bits and each of said first plurality of instructions comprises at least 16 bits.

4. The processor of claim 1 wherein said end marker comprises at most three bits.

5. The processor of claim 1 wherein said second plurality is equal to seven.

6. A processor comprising:
   a first plurality of instructions in a packet of instructions in said processor;
   at most three issue groups in said packet;
   a template in said packet, said template having at least one end marker, said at least one end marker dividing said first plurality of instructions into said at most three issue groups, wherein each of said at most three issue groups comprises at least one of said first plurality of instructions.

7. The processor of claim 6 wherein said first plurality is equal to seven.

8. The processor of claim 6 wherein said template in said packet has two end markers.

9. The processor of claim 6 wherein said template in said packet has three end markers.

10. The processor of claim 6 wherein said packet comprises at least 128 bits and each of said first plurality of instructions comprises at least 16 bits.

11. The processor of claim 6 wherein said at least one end marker comprises at most three bits.

12. A processor comprising:
    a first plurality of instructions in a packet of instructions in said processor;
    a template in said packet, said template comprising a plurality of end markers;
    a mask generation logic, said mask generation logic generating a first mask during a first clock cycle, said first mask corresponding to a first one of said plurality of end markers in said template;
    said first mask selecting a second plurality of instructions in said packet, said second plurality being less than or equal to said first plurality, said second plurality of instructions belonging to a first issue group.

13. The processor of claim 12 wherein said mask generation logic generates a second mask in a second clock cycle, said second mask corresponding to a second one of said plurality of end markers in said template;
    said second mask selecting a third plurality of instructions in said packet, said third plurality being less than or equal to said first plurality, said third plurality of instructions belonging to a second issue group.

14. The processor of claim 12 wherein said mask generation logic generates a third mask in a third clock cycle, said third mask corresponding to a third one of said plurality of end markers in said template;
    said third mask selecting a fourth plurality of instructions in said packet, said fourth plurality being less than or equal to said first plurality, said fourth plurality of instructions belonging to a third issue group.

15. The processor of claim 12 wherein said first plurality is equal to seven.

16. The processor of claim 12 wherein said packet comprises at least 128 bits and each of said first plurality of instructions comprises at least 16 bits.

17. The processor of claim 12 wherein each of said plurality of end markers comprises at most three bits.

18. A method comprising the steps of:
    providing a plurality of end markers in a template in a packet of instructions in a processor;
    dividing a first plurality of instructions in said packet into at most three issue groups, each of said at most three issue groups being identified by said plurality of end markers.

19. The method of claim 18 wherein said first plurality of instructions comprises seven instructions.

20. The method of claim 18 wherein said plurality of end markers comprises two end markers.

21. The method of claim 18 wherein said plurality of end markers comprises three end markers.

22. The method of claim 18 wherein said packet comprises at least 128 bits and each of said first plurality of instructions comprises at least 16 bits.

23. The method of claim 18 wherein each of said plurality of end markers comprises at most three bits.

24. A processor comprising:
    a first plurality of instructions in a packet of instructions in said processor;
    a second plurality of issue groups in said packet, said second plurality being less than said first plurality;
    each of said second plurality of issue groups comprising at least one of said first plurality of instructions;
    each of said first plurality of instructions belonging to one of said second plurality of issue groups;

wherein said packet comprises a template having a plurality of end markers, said plurality of end markers identifying each of said second plurality of issue groups in said packet.

25. The processor of claim 24 wherein each of said plurality of end markers comprises at most three bits.

26. The processor of claim 24 wherein said plurality of end markers comprises two end markers and wherein said two end markers identify each of said second plurality of issue groups in said packet.

27. The processor of claim 26 wherein each of said two end markers comprises at most three bits and wherein said second plurality of issue groups comprises three issue groups.

28. A processor comprising:
- a first plurality of instructions in a first packet of instructions in said processor;
- a second plurality of instructions in a second packet of instructions in said processor;
- a first packet template, said first packet template including a chaining bit;
- said chaining bit causing a third plurality of instructions in said first packet and a fourth plurality of instructions in said second packet to be placed in a combined issue group;
- wherein said first packet template includes a plurality of first packet end markers, said plurality of first packet end markers identifying at most three first packet issue groups.

29. The processor of claim 28 further comprising a second packet template, wherein said second packet template includes a plurality of second packet end markers, said plurality of said packet end markers identifying at most three second packet issue groups.

30. The processor of claim 28 wherein each of said plurality of first packet end markers comprises at most three bits.

31. The processor of claim 29 wherein each of said plurality of second packet end markers comprises at most three bits.

* * * * *